ELECTRON DISCHARGE SYSTEMS

Filed Aug. 27, 1954 4 Sheets-Sheet 1

ROBERT ADLER
INVENTOR.

BY Francis W. Crotty

HIS ATTORNEY.

Electron Trajectory in Periodic Focusing Field
(Y-Y axis expanded 20:1)

ROBERT ADLER
*INVENTOR.*

BY Francis W. Crotty

HIS ATTORNEY.

April 22, 1958 R. ADLER 2,832,001

ELECTRON DISCHARGE SYSTEMS

Filed Aug. 27, 1954 4 Sheets-Sheet 3

ROBERT ADLER
*INVENTOR.*

BY Francis W. Crotty

HIS ATTORNEY.

ROBERT ADLER
*INVENTOR.*
BY Francis W. Crotty
HIS ATTORNEY.

2,832,001

ELECTRON DISCHARGE SYSTEMS

Robert Adler, Northfield, Ill., assignor to Zenith Radio Corporation, a corporation of Illinois Application August 27, 1954, Serial No. 452,620

26 Claims. (Cl. 315—3.6)

This invention relates to new and improved electron-discharge devices and systems and is particularly directed to electron-discharge systems in which the effect of thermal noise and other forms of noise energy is effectively minimized.

At relatively low frequencies, the three conventional means for controlling or modulating electron streams (grids, deflectors and bunchers) appear to the signal source as pure capacities; consequently, no real power is required to drive the controlling elements. At low frequencies, the resistance of the signal source may be stepped up as much as bandwidth considerations permit and, at least in the case of narrow-band circuits, the signal may be stepped up to such an extent that random fluctuations or noise in the electron stream become unimportant; in other words, the noise figure approaches unity and may be expressed as zero decibels.

At relatively high frequencies, such as the V. H. F. and U. H. F. television bands and the FM radio band, two undesirable noise effects which are negligible at lower frequencies assume greatly increased importance. Because the electrons of the stream require a finite period of time to traverse the field of the controlling element, be it grid, deflector or buncher, the field changes noticeably during the transit time interval, which causes an interchange of energy between the control element and the electron stream. This energy-interchange effect causes an apparent conductance to appear in parallel with the capacity of the control electrode; the conductance increases with the square of frequency. Consequently, the tube no longer appears to the signal source as an infinite resistance and the step-up ratio must be accordingly reduced.

The second disturbing noise effect at high frequencies results from the fact that random fluctuations in the electron stream induce currents in the control element. If the input circuit is resonant at the signal frequency, these fluctuation currents must flow through the parallel combination of the conductance of the controlling means and the transformed conductance of the signal source. A voltage is thus generated across the controlling means and produces new fluctuations in the electron stream. This phenomenon is well known in the art as "induced grid noise;" equivalent effects are found to exist in deflector and buncher control systems. In any of these control systems, the induced noise is characterized by the fact that any finite source impedance across the control system increases the noise energy in the electron stream above its original noise content. Consequently, at relatively high frequencies the noise effects in devices such as television and radio receivers and similar apparatus present extremely difficult problems which may severely limit the performance of the apparatus.

It is an object of the invention, therefore, to provide a new and improved electron-discharge system which is operable at relatively high frequencies and which does not introduce an excessive amount of noise into a signal transmission channel.

It is another object of the invention to provide a new and improved electron-discharge amplifier in which induced control-element noise is effectively eliminated.

It is a further object of the invention to provide a new and improved beam-deflection electron-discharge amplifying system in which noise effects are substantially reduced without requiring the use of complex and expensive circuitry.

An electron-discharge system constructed in accordance with one aspect of the invention comprises electron gun means for projecting a beam of electrons along a given reference path and means for developing a guiding field along a first predetermined portion of that path. The guiding field is employed to confine the electron beam to the reference path throughout the first portion thereof and is also utilized to establish a transverse resonance frequency for the electron beam. The system further includes means responsive to an applied signal for subjecting the electron beam to a variable transverse deflection field which has a frequency substantially equal to the transverse resonance frequency of the beam to deflect the beam from the center of its reference path. A deflection-sensitive electrode system is coupled to the electron beam along a second portion of the reference path; this electrode system includes means for increasing the transverse excursions of the electron beam and for generating an amplified signal which is representative of the applied signal.

In the succeeding portions of the specification, several different embodiments of the invention are described and discussed. One particular feature of the invention is especially advantageous in that it may be employed in conjunction with a wide variety of substantially different deflection-sensitive output electrode systems to provide a substantial reduction in noise translated to succeeding stages of a signal channel.

It is an additional object of the invention therefore, to provide a new and improved electron-discharge noise-reduction system adaptable for use with a relatively wide variety of output electrode structures.

It is a more specific object of the invention to provide a new and improved noise-absorption system for beam-deflection discharge devices including modulators as well as amplifiers of various types.

It is a corollary object of the invention to provide a new and improved noise-absorption system for a beam-deflection electron-discharge device which places no basic limitations upon the structure of the output electrode system.

In a second aspect, therefore, the invention comprises a noise-absorption system for an electron-discharge device of the beam-deflection type including electron gun means for projecting an electron beam along a given reference path and a deflection-sensitive output electrode system. The noise-absorption system comprises a first deflector structure including a first and a second series of deflector elements disposed in interleaved fashion adjacent one side of the reference path intermediate the electron gun means and the output electrode system, the elements of the first deflector series being electrically insulated with respect to unidirectional currents from the elements of the second series. A second deflector structure, substantially identical electrically and physically with the first such structure, is included in the system; this second deflection structure comprises a third and a fourth series of deflector elements disposed in interleaved fashion adjacent the opposite side of the reference path with elements of the third deflector series opposite elements of the first series and with the fourth series opposite the second series. Means are provided for maintaining the first and third deflector element series at a first predetermined operating potential and further means are provided to establish the second and fourth series of deflector elements at a second predetermined operating potential which is substantially different from the operating potential of the first and third series.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like elements are identified by like numerals in each of the figures, and in which:

Figure 1:
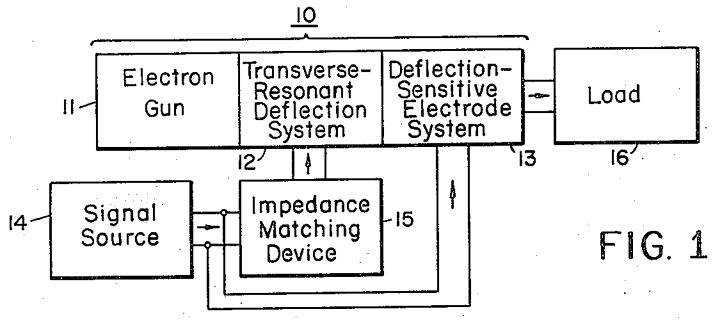
Figure 1 is a block diagram illustrating a basic concept of the invention.

The block diagram of Figure 1 illustrates the generic concept of the system; the various elements of the block diagram are separately identified in connection with each of the specific embodiments of the invention described and discussed hereinafter. The illustrated electron-discharge system comprises a beam-deflection tube 10 including an electron gun 11, a transverse-resonant deflection system 12, and a deflection-sensitive electrode system 13. A signal source 14 is coupled to deflection system 12 by means of an impedance matching device 15; device 14 may comprise any source of the desired signal, which, in a typical application, may be a carrier signal modulated with intelligence such as a radio or television signal. For some embodiments of the invention, a load circuit may be substituted for matching device 15 and signal source 14 may be coupled to the output electrode system 13 instead of to deflection system 12; on the other hand, for some particular applications it may be desirable to couple the signal source to both of systems 12 and 13. Output electrode system 13 is also coupled to a load circuit 16 which is preferably balanced and which may, for example, comprise the input stage of an amplifier, detector, or other conventional signal utilization device. The entire apparatus of Figure 1 may comprise a signal-transmission channel in a television receiver or similar apparatus; for example, signal source 14 may comprise the antenna of a television receiver and load 16 may be the first detector of that receiver. A wide variety of specific applications for the invention will be immediately apparent to those skilled in the art.

Before considering specific embodiments of the invention, a brief discussion of the underlying theory of operation may be desirable. Electron gun 11 may be of conventional construction and may be varied in its structural details to conform to the requirements of the succeeding portions of electron tube 10. The electron gun is employed to project a beam of electrons along a given reference path extending through electrode systems 12 and 13. The transverse-resonant deflection system 12 must include, at least in part, some means for developing a guiding field along a first predetermined portion of that reference path; the guiding field may be either a magnetic or an electric field, depending to some extent upon the type of output electrode system employed. The guiding field serves a dual purpose; it acts to confine the electron beam to the desired reference path as the beam traverses deflection system 12 and at the same time establishes a transverse-resonance frequency for the electron beam. In the case of a magnetic field, this transverse-resonance frequency is the familiar cyclotron frequency determined in accordance with the equation $$f_c = 2.8H \qquad (1)$$

in which $f_c$ is the cyclotron frequency in megacycles per second and H is the magnetic field intensity in gauss. A periodic electric field having somewhat similar properties may be employed instead of the magnetic field; the determining factors for the transverse-resonance frequency in the case of an electric field are somewhat more complex and are discussed in connection with specific embodiments set forth hereinafter.

In an article entitled "The electron coupler—a spiral-beam U. H. F. modulator," by C. L. Cuccia and J. S. Donal, Jr., in the March 1950 issue of "Electronics" on pages 80–85, there is described a device in which a homogeneous magnetic field is employed to condition the transfer of electrical energy between a pair of similar deflection systems immersed in the field and coupled to an electron beam projected longitudinally of the field. The first, or input, deflection system is coupled to a source of signals having a frequency equal to the cyclotron frequency established by the magnetic field. The electron beam is deflected along a conical path; the rotating beam, in turn, induces a current in the input deflection system which is in phase with the applied signal so that the deflection system appears to have a definite positive conductance. In the second deflection system, the beam again induces a current; if the second set of deflectors is loaded with an external conductance equal to the aforementioned apparent conductance of the first system and is tuned to the cyclotron frequency, virtually all of the signal energy applied to the input deflectors may be transferred to the load. Thus, a given amount of signal energy is first transferred from the input deflection system to the electron beam and then from the electron beam to the output deflection system; the electron coupler cannot be employed as an amplifier.

The electron-discharge systems of the present invention utilize some of the principles employed in the electron coupler in a novel structural environment to provide an entirely new effect: relatively noise-free amplification of high-frequency signals. In Figure 1, deflection system 12 is tuned to the transverse resonance frequency of the deflection system and coupled to signal source 14 through impedance-matching device 15. Device 15 matches the source impedance to the apparent conductance of the deflection system; conversely, the signal source appears as a matched load to deflection system 12. Under these conditions, the deflection system and its load comprise a noise-reduction system for the electron beam from gun 11; transverse motion of electrons in the beam recurring at frequencies equal to or closely adjacent the transverse resonance frequency induces currents in the deflectors of system 12. Noise energy represented by transverse motion of the beam is thus transferred to the deflection system and dissipated in circuit 14; as a result, a substantially noise-free beam remains. At the same time, a signal may be applied to deflection system 12 from source 14 to subject the beam to a transverse deflection field having a frequency substantially equal to the transverse resonance frequency of the deflection system; as the beam emerges from deflection system 12, its transverse motion is determined almost entirely by the applied signal and does not include excessive noise components. It will be understood that this explanation neglects minor effects which cause somewhat less-than-perfect noise absorption, but the overall results present a striking improvement over known devices.

The deflection-sensitive electrode system 13 is coupled to the electron beam along a second portion of its reference path and is utilized to generate an amplified signal representative of the signal applied to tube 10 from source 14; the amplified signal is then supplied to a utilization device represented by load 16. Where the input signal is applied to deflection system 12, amplification is obtained in electrode system 13 by permitting or by causing transverse excursions of the electron beam effected in deflection system 12 to increase appreciably before the output signal is derived. However, the objectives of the invention in regard to noise reduction may be realized without coupling the signal source to deflection system 12, provided matching device 15 is replaced by a load conductance for the deflection system equal to the apparent conductance of the deflectors at the transverse-resonance frequency. The signal from source 14 is then applied to a portion of electrode system 13 to modulate the noise-free beam as it emerges from system 12, in which case succeeding portions of the output electrode system must provide for increasing transverse excursions of the electron beam and for generating the desired amplified signal. Thus the signal-deflection portion of the overall electron-discharge system may comprise elements common to either of the noise-absorption and the output portions of the system.

Figure 2:
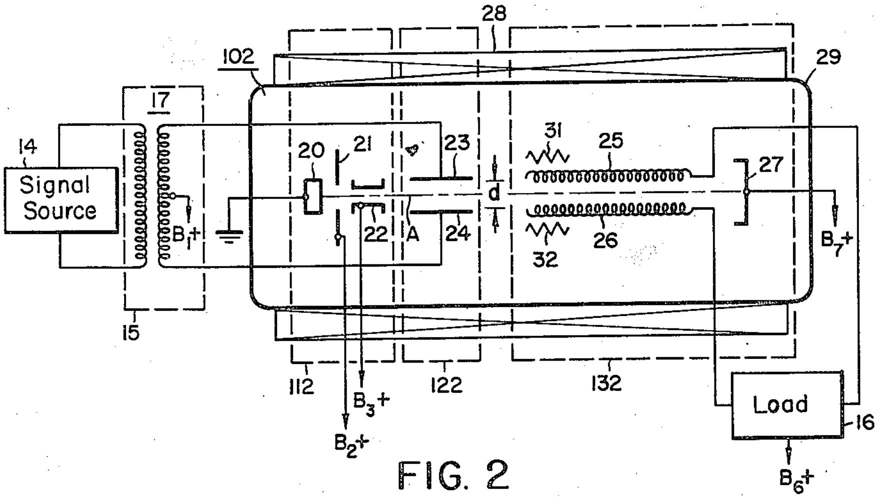
Figure 2 is a schematic drawing of one embodiment of the invention.

Figure 2 illustrates a specific embodiment of the invention in which a magnetic field is utilized to guide the electron beam. The electron-discharge system of Figure 2 comprises a signal source 14 coupled to an impedance-matching device 15, here represented in simple form as an impedance-matching transformer 17. The electron-discharge system further includes a beam-deflection tube 102 comprising an electron gun section 112, a deflection section 122, and a deflection-sensitive output electrode section 132; these tube sections are individually indicated by dash outlines and correspond to the similarly-designated portions of device 10 of Figure 1. Electron gun section 112 may be conventional in form, and may, for example, include a cathode 20, an accelerator 21 and a collimating electrode 22. Cathode 20 is connected to a plane of reference potential, here indicated as ground, and accelerator 21 and collimator 22 are individually connected to suitable sources of unidirectional positive operating potential $B_2+$ and $B_3+$ respectively.

Deflection system 122 comprises a pair of deflectors 23 and 24 which are individually connected to the opposite ends of the secondary winding of impedance-matching transformer 17. The deflectors are also coupled to a source of D. C. operating potential $B_1+$ by means of a center tap on the transformer secondary.

The deflection-sensitive electrode system 132 comprises a pair of wave-transmission lines 25 and 26 and a collector electrode 27. Wave-transmission lines 25 and 26 may each comprise a helical conductive winding and should have a low wave-propagation velocity along their lengths and an overall length which is large relative to the effective wavelength of a signal wave traveling along the lines. The ends of wave-transmission lines 25 and 26 adjacent collector 27 are electrically connected to the load circuit 16, which may include means for connecting a D. C. operating potential source $B_6+$ to the two lines. Collector 27 is connected to a further source of positive operating potential $B_7+$.

The electron-discharge system of Figure 2 further includes means for developing a guiding field, which in this instance comprises a solenoid winding 28. In effect, solenoid 28 forms a part of output electrode system 132 and is also a part of deflection system 122, as will be made more apparent in the succeeding description of the operation of the device. Solenoid 28 is preferably mounted in external encompassing relation to the usual evacuated envelope 29 which encloses the various electrodes of sections 112, 122, and 132.

When the apparatus of Figure 2 is placed in operation, electron gun section 112 generates and projects a stream of electrons along a reference path generally indicated by dash line A. The electron stream is accelerated and collimated to form a beam as it passes through electrodes 21 and 22 and continues along the reference path to be intercepted by collector 27, which is disposed transversely of the reference path at the opposite end of envelope 29 from cathode 20. One portion of reference path A is bounded by deflectors 23 and 24, which are mounted on opposite sides of the path in inductive coupling relation to the electron beam; similarly, a second portion of the reference path extends between the two wave-transmission line 25 and 26, which are also electrostatically coupled to the beam. At the same time, solenoid 28 is energized from some suitable source (not shown) to develop a homogeneous magnetic field along both portions of the reference path. This magnetic field exerts a collimating effect upon the electrons of the beam and serves to confine the beam within the maximum path width $d$ in known manner in both that portion of reference path A included within deflection system 122 and that portion encompassed within the output electrode system 132. The magnetic field also establishes a transverse-resonance cyclotron frequency for the electron beam; the cyclotron frequency for any given magnetic field may be determined in accordance with Equation 1.

Impedance-matching transformer 17 is adjusted so that the source impedance for deflection system 122 is matched to the apparent conductance between deflectors 23 and 24 at the transverse-resonance frequency. Under these conditions, the impedance-matching device and the two deflectors function as a noise-absorption system for tube 102 which tends to absorb from the electron stream any random fluctuations occurring at or near the cyclotron frequency. Moreover, the deflection-control system does not induce transverse-resonance frequency noise energy into the electron beam; on the contrary, it tends to reduce the noise content of the beam.

A signal having a frequency substantially equal to the cyclotron frequency of the beam is applied from source 14 through transformer 17 to deflectors 23, 24. Consequently, the electron beam is subjected to a variable transverse deflection field, having a frequency substantially equal to the transverse-resonance frequency of the beam, which produces excursions of the beam from the center line A of its reference path. As the beam enters that portion of the reference path included within output electrode system 132, its transverse excursions are determined primarily by the deflection field established between electrodes 23 and 24 and do not include induced noise components, an effect which cannot be achieved with conventional devices. Indeed, the random noise components inevitably present in the beam at the start are attenuated rather than enhanced at the signal frequency.

As the beam passes through the deflection-sensitive output electrode system, it first induces a signal in wave-transmission lines 25 and 26; at subsequent points along the wave-transmission lines, the electron beam and the signal on the transmission lines interact so that the transverse excursions of the beam increase and the signal wave traveling along the lines is exponentially amplified. In order to avoid reflections along the wave-transmission lines and to prevent oscillation in the output electrode system, it is necessary that the two transmission lines be properly terminated. This termination may be achieved in known fashion by means of a pair of resistive elements 31 and 32 disposed within tube 102 in close proximity to the ends of lines 25 and 26 adjacent deflection system 122. The resistive elements may, for example, comprise coatings of highly resistive material deposited upon mica sheets or similar support members and mounted closely adjacent the wave-transmission lines. If desired, the two transmission lines may be terminated by means of a resistive element interconnecting the ends of the lines nearest deflection system 122.

The amplified signal developed in transmission lines 25 and 26 is applied to load circuit 16 and may be employed therein in conventional manner. The electron beam continues generally along the reference path and is intercepted and collected by electrode 27. The principles of operation of electrode system 132, which constitutes a transverse-mode traveling-wave tube of the magnetic field type, are known in the art and need not be repeated here; for a detailed theoretical consideration of the operation of this section of tube 102, reference may be had to chapter 13 of the book "Traveling Wave Tubes" by J. R. Pierce, published by D. Van Nostrand Co. Inc., New York, 1950. It should be noted that in order to achieve the desired amplification, the velocity of the electron beam should be maintained approximately equal to twice the wave-propagation velocity along lines 25 and 26 as the beam traverses the portion of reference path A included within electrode system 132; this relationship may be readily obtained by proper selection of the operating potential applied to the wave-transmission lines from source $B_6+$.

In order to obtain an optimum realization of the advantages of the invention, the electron gun employed should develop a beam of the so-called ribbon or sheet type. For the purposes of this application, a sheet-like beam of electrons may be defined as having one principal cross-sectional dimension which is very much greater than a second principal cross-sectional dimension, these dimensions being determined by the configuration of the electron gun electrodes 21 and 22 or their equivalents where other forms of gun construction are employed. For a tube utilizing a magnetic collimating field such as that illustrated in Figure 2, the electron beam may, for example, be of annular cross-sectional configuration with a circumference very much larger than the radial thickness of the annulus; for other devices embodying the invention it may be desirable to employ beams of rectangular cross-sectional configuration having a height much greater than their thickness or it may prove desirable to employ other equivalent beam configurations. In general, ribbon or sheet beams are desirable in that they provide substantially higher permeance than may be obtained with pencil beams, although many advantages of the invention may also be obtained with the latter type of electron beam.

Figure 3:
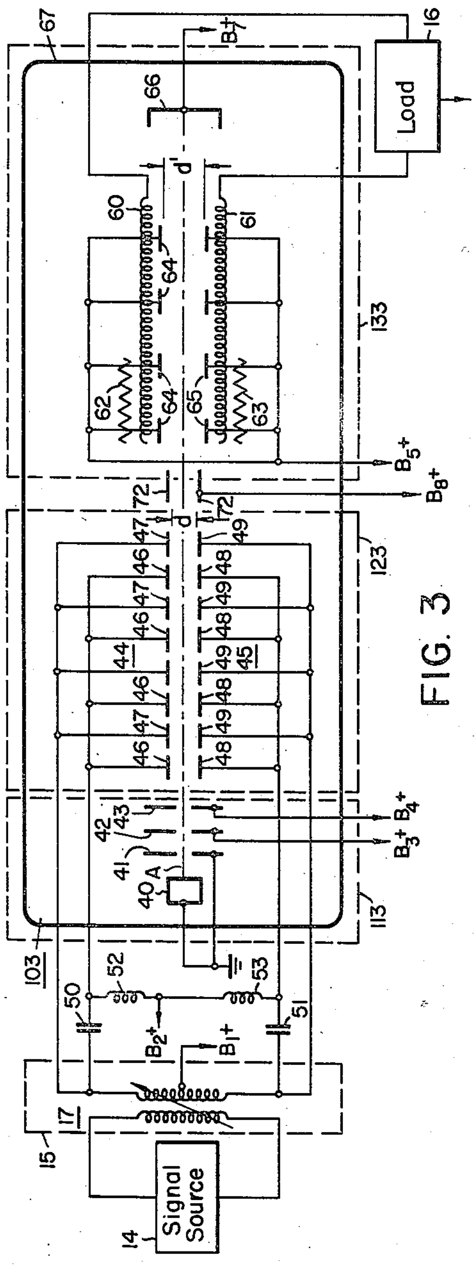
Figure 3 is a schematic view of a second embodiment of the invention.

Figure 3 illustrates a substantially different form of the invention in which an electric guiding field is employed instead of the magnetic field utilized in the embodiment of Figure 2. The electron-discharge system of Figure 2 comprises a beam-deflection tube 103 including an electron gun section 113, a transverse-resonant deflection section 123 and a deflection-sensitive output electrode syster 133; tube sections 113, 123 and 133 are indicated by individual dash outlines and correspond to sections 11, 12 and 13 respectively of tube 10 in Figure 1.

Electron gun 113 may be of conventional construction and may include a cathode 40, a focusing electrode 41, an accelerator 42 and a collimating or beam-limiting electrode 43; each of electrodes 41–43 includes a central slot preferably centered about a reference path indicated by center line A. Focusing electrode 41 and cathode 40 are each connected to a plane of reference potential, here shown as ground; accelerator 42 and collimator 43 are individually connected to positive operating potential sources $B_3+$ and $B_4+$ respectively.

Deflection system 123 comprises two composite deflector structures 44 and 45 disposed on opposite sides of reference path A in inductive coupling relationship to the electron beam of the tube. Deflector structure 44 includes a first series of deflector elements 46 disposed in coplanar interleaved fashion with respect to a second series of similar deflector elements 47; although each deflector series is illustrated as including four individual elements, it is usually preferable to have a substantially greater number of deflectors in each series. Composite deflector 45 is substantially identical electrically and physically with structure 44 and comprises a third series of deflector elements 48 interleaved with a fourth deflector element series 49, the deflectors of series 48 being disposed opposite elements of series 46 and the elements of deflector series 49 being located opposite deflectors 47.

Deflectors 46 of structure 44 are electrically insulated from the deflectors of series 47 with respect to unidirectional currents (D. C.); however, the first and second series of deflectors are coupled together for radio frequencies by means of a coupling capacitor 50. Similarly, deflector element series 48 and 49 are insulated from each other for D. C. but are intercoupled for radio frequencies by a capacitor 51. Composite deflectors 44 and 45 are coupled to the opposite ends of the secondary winding of an impedance matching transformer 17 which, as indicated by dash outline 15, corresponds to the impedance-matching device of Figure 1. A signal source 14 is coupled to the primary winding of transformer 17. As in the previously described embodiments, any suitable form of impedance-matching device may be substituted for transformer 17. Deflector series 46 is connected to a source of positive unidirectional operating potential $B_2+$ by a radio-frequency choke coil 52; similarly, deflector series 48 is connected to D. C. source $B_2+$ through a choke 53. Deflector series 47 and 49 are connected to a D. C. operating potential source $B_1+$ by means of a center tap on the secondary winding of transformer 17.

Deflection-sensitive output electrode system 133 of tube 103 comprises an electrostatically-focused transverse-mode traveling-wave tube. Electrode system 133 includes a pair of low-velocity wave-transmission lines which may comprise a pair of helical conductive windings 60 and 61 disposed on opposite sides of reference path A in inductive coupling relation to the electron beam of the tube. Each of the wave-transmission lines has a low wave-propagation velocity parallel to path A and has a length in that direction which is large in relation to the effective wavelength of a signal wave traveling along the lines. Respective resistive loading elements 62 and 63 are individually associated with transmission lines 60 and 61 and are employed to provide a matched termination for the two lines.

The output electrode system 133 further includes a first series of lens electrodes 64 interposed at spaced intervals between transmission line winding 60 and reference path A; a second series of lens electrodes 65 is distributed along reference path A between the reference path and winding 61. Preferably, lens elements 65 are located directly opposite lens electrodes 64. All of the lens electrodes are electrically interconnected with each other and are connected to a source of positive unidirectional operating potential $B_5+$. Electrode system 133 further includes a collector electrode 66 disposed transversely of reference path A; the collector is connected to a D. C. source $B_7+$. In addition, the ends of wave-transmission lines 60 and 61 adjacent collector 66 are electrically connected to balanced load circuit 16 and to a source of positive unidirectional operating voltage $B_6+$. All of the electrodes of sections 113, 123, and 133 extend for a substantial distance in a dir..ction perpendicular to the plane of the drawing and are enclosed within an evacuated envelope 67.

When the electron-discharge system of Figure 3 is placed in operation, electrons from cathode 40 are focused, accelerated and collimated into a ribbon-type electron beam as they pass through the aperatures in electrodes 41—43. For this particular embodiment, an electron beam of substantially rectangular cross-sectional configuration with a height very much greater than its width is preferred, although other beam configurations may be employed.

The deflector electrodes of series 46 and 48 are maintained at a potential positive with respect to cathode 40 by means of the connection to source $B_2+$, whereas the deflectors of series 47 and 49 are established at a substantially different positive potential by virtue of their connection to source $B_1+$. The ratio between the potentials from sources $B_1+$ and $B_2+$ may be of the order of 2:1 but may vary widely. The potential differences between adjacent pairs of the deflector elements establishes a series of convergent electrostatic lenses along the portion of reference path A included within deflector system 123; the electrical lens field thus established tends to confine the electron beam within the desired maximum beam width $d$ throughout that portion of the reference path.

Electron focusing within the deflection system 123 is caused by transverse components of the electric field established between individual pairs of deflector elements. Along the center plane indicated by dash line A, the transverse field is zero; it increases with distance from the center line. Consequently, it may be shown that electrons of the beam are subjected to a force which tends to accelerate them away from center plane A in regions of high potential and are accelerated toward the center plane in low-potential regions, so that small ripples are imposed upon the electron trajectories. The low-potential regions, however, exert the major influence because the electrons are farther from the center plane as they traverse these regions and are consequently in a stronger field; at the same time the electrons move more slowly through the low-potential regions and hence require more time to traverse them. The two effects are equally strong and result in a net force tending to deflect the electrons toward the center plane of the reference path. This effect is comparable to an elastic force; consequently, the beam electrons follow simple harmonic motion trajectories centered about the center plane A of the reference path.

Figure 4:
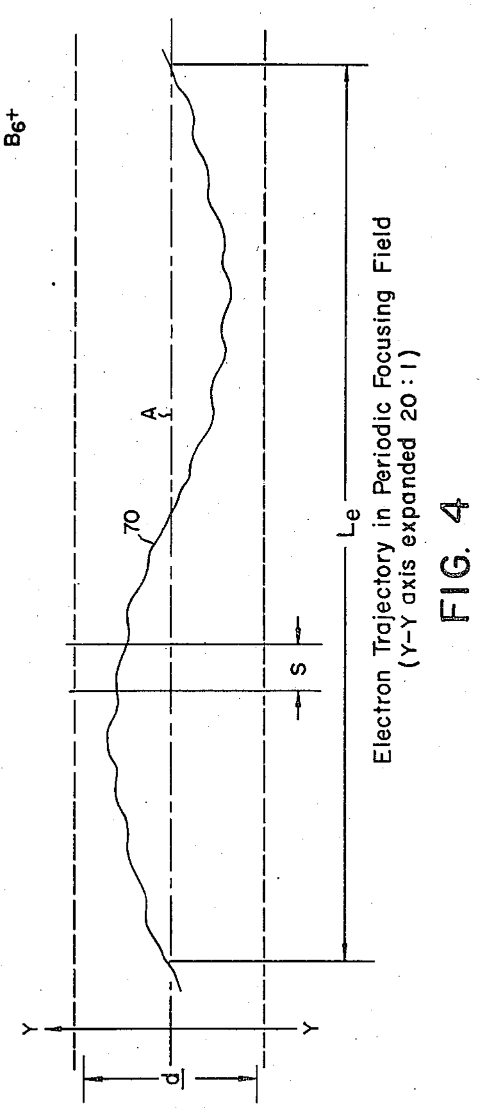
Figure 4 is an explanatory diagram illustrating certain operating characteristics of a portion of the apparatus illustrated in Figure 3.

Figure 4 illustrates the trajectory of an electron as it traverses that portion of reference path A included within deflection system 123. As indicated by line 70, the electron follows a substantially sinusoidal path with minor ripples, each ripple corresponding to one spatial period $s$ of the guiding field. The electron trajectory has a definite wavelength $L_e$ which may be determined approximately in accordance with the equation (2) $$L_e=\frac{2V_0}{V_1}$$

where $V_0$ is the average D. C. potential of deflector elements 46—49 and $V_1$ is the amplitude of the periodic potential component in the center plane. The equation is accurate only if the electrostatic guiding field is a sinusoidal function of distance along path A, but provides a good first-order approximation for the periodic fields usually employed.

Electron trajectories of the general type illustrated in Figure 4 can only be obtained if certain criteria are observed. Most importantly, the electrons of the beam must be limited in their excursions from center line A to a strip no wider than about one-third the spatial period of the guide structure; in other words, spatial period $s$ must be at least three times as large as maximum beam width $d$. This rule has been intentionally violated in the presentation of Figure 4, in which the transverse $y$—$y$ axis has been greatly expanded in order to show the ripples in the electron trajectory more clearly. The periodic deflector structure must be of sufficient overall length that it encompasses at least one wavelength $L_e$ at the elastic- or transverse-resonance frequency. It should be noted that it may sometimes be advantageous to have deflector elements for the high and low potentials of different length in the direction of electron travel; ideally, the deflectors should be infinitely high in a direction perpendicular to the plane of the drawing in Figures 3 and 4 and in practice their height is made very much greater than their length. The lens voltages required to obtain a given electron resonance frequency are substantially independent of the beam current, since the transverse-resonance elastic field frequency is not dependent upon the beam intensity, as is apparent from the equation for determining this frequency:

(3) $$f_q=\frac{30V_1}{s\sqrt{V_0}}$$

where $f_q$ is the resonance frequency in megacycles. Again, the equation assumes a sinusoidal field, but provides a good working approximation.

The properties of the quasi-elastic or periodic electric guiding field developed in deflector section 123 of tube 103 are in many respects equivalent to those of a magnetic field with its cyclotron resonance frequency. Two significant differences should be noted; with a given collimating system in the electron gun and at a given resonant frequency, the elastic electric field produces a more concentrated beam than does a homogeneous magnetic field, since the electric field effectively focuses the electron stream about a center plane rather than merely collimating the electrons of the beam with respect to paths parallel to that plane. Perhaps more important is the fact that the difficulties normally associated with initiating and terminating a magnetic field do not exist with electrostatic focusing, and the construction of the output electrode system employed in conjunction with the electrostatic structure is not limited to one which may be immersed in the same guiding field.

Transverse-resonant deflection struction 123 operates to absorb noise from the electron beam in much the same manner as deflection system 122 of Figure 2. The impedance-matching device 15 is tuned to the resonance frequency of the guiding field and the impedance of that device is also adjusted to match the apparent conductance of composite deflectors 44 and 45 at the resonance frequency. Under these conditions, the deflector structures 44, 45 and device 15 constitute a noise-reduction system for tube 103 which absorbs noise energy represented by transverse fluctuations of the beam electron recurring at the resonance frequency. As in the embodiment of Figure 2, no noise energy is induced into the electron stream by the deflection system.

A signal having a frequency substantially equal to the transverse-resonance frequency is applied to composite deflectors 44 and 45 by virtue of the connection to signal source 14 through matching device 15. The applied signal establishes a transverse deflection field which produces excursions of the electron beam from reference path center line A at the resonance frequency. As the beam traverses output electrode system 133, the transverse excursions of the beam induce a signal wave in transmission line windings 60 and 61; at subsequent points along the wave-transmission lines, this induced signal interacts with the electron beam to increase the transverse excursions of the beam. By virtue of this interaction, an exponentially amplified sifinal is induced in the two transmission lines and is applied to load circuit 16.

The two transmission lines are maintained at a substantially different operating potential from that of lens electrodes 64, 65, so that electrons of the beam are confined within a maximum path width $d'$ throughout the output electrode system. Because of the potential difference between the tranrmission-line winding and the lens electrodes, a second periodic focusing or guiding field substantially similar to that of deflection structure 123 is established in output electrode system 133. However, it is not necessary to use the same transverse-resonance frequency in the output electrode system as in the deflection system; on the contrary, a periodic focusing field of substantially lower transverse resonance frequency is usually desirable in the output system. Moreover, it may be desirable to permit the beam to spread somewhat in the region between the deflection and output electrode systems, so that the maximum beam width $d'$ in the output electrode system may be made somewhat larger than the beam width $d$ in the deflection system. In this event, it may be desirable to include a pair of lens plates 72 on opposite sides of reference path A intermediate the deflection and output systems; the lens plates may be connected to a D. C. operating potential source $B_3+$. The potential of lens plates 72 may then be adjusted in relation to the potential of the wave-transmission lines to collimate the beam as it enters the portion of reference path A intermediate the wave-transmission lines.

Figure 5:
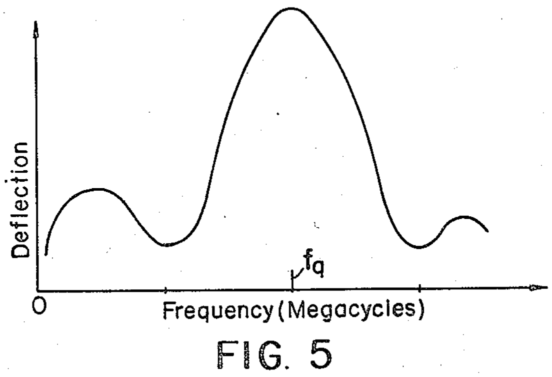
Figure 5 is a graphical representation of certain frequency characteristics of the embodiment of Figure 3.

The frequency response characteristic of deflection system 123 is illustrated in Figure 5, in which the effective deflection achieved in the system at a constant signal amplitude is plotted as a function of the signal frequency. It will be observed that a substantial peak is achieved at the transverse-resonance frequency $f_q$ of the deflection system. The same curve is directly indicative of the frequency-selective nature of the noise-absorption system comprising the composite deflectors, source 14, and impedance-matching device 15.

The electrostatically focused transverse-mode traveling-wave output electrode system 133 may constitute any one of a relatively wide variety of specific structures. Traveling-wave tubes comprising output electrode systems of this type are disclosed and claimed in the copending applications of Robert Adler, Serial Nos. 394,797 and 384,798, both filed November 27, 1953 and assigned to the same assignee as the present application. A relatively detailed description of the principles of operation and of the structural requirements for this type of traveling-wave amplifier is included in each of these copending applications, so that an exhaustive discussion of this portion of tube 103 is deemed unnecessary.

Figure 6:
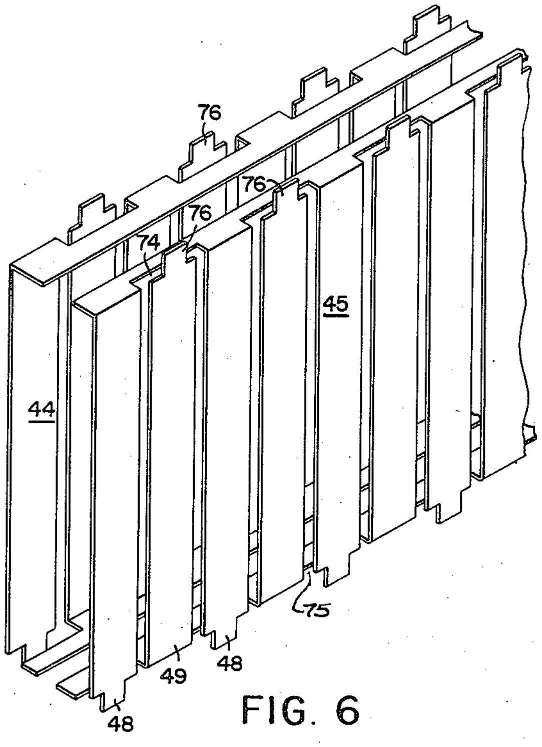
Figure 6 is an oblique view illustrating one form of deflector electrode construction which may be employed in conjunction with the invention.

Figure 6 illustrates one suitable construction for composite deflectors 44 and 45 of deflection system 123. In this particular structure, deflector series 48 comprises a substantially comb-shaped structure which may, for example, be stamped from a single sheet of metal. Similarly, deflector series 49 comprises a comb-shaped structure stamped from some metal suitable for use in a vacuum; the two deflector-series structures are mounted in interleaved relationship with the individual elements of each series positioned between two adjacent element of the other series. A plurality of indentations 74 are formed in the comb-shaped structure of series 48 to prevent electrical contact between elements 48 and elements 49; a similar series of indentations 75 in comb 49 prevents contact at the opposite end of the composite deflector structure. The construction of deflector 44 is identical with that of structure 45. In each case, the individual lens elements may be provided with tabs 76 which may be fitted into a sheet of mica or other insulating material to facilitate mounting within the envelope of the tube.

Figure 7:
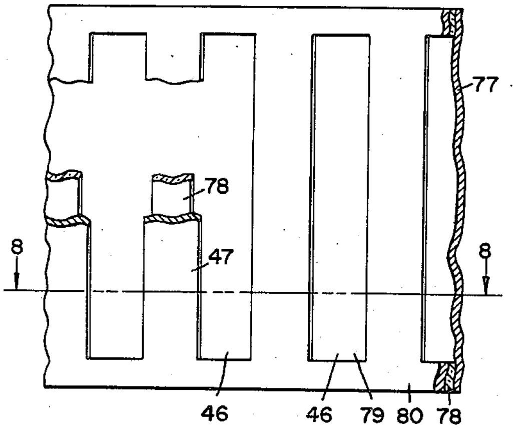
Figure 7 is a side view, partially cut-away, of another composite deflector electrode constructed in accordance with one aspect of the invention.
Figure 8:
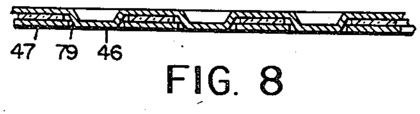
Figure 8 is a cross-sectional view of a modified form of the electrode structure of Figure 7 taken along line 8—8 therein.

A somewhat different construction for the composite deflectors 44 and 45 of deflection system 123 is shown in Figure 7. This particular structure includes a continuous sheet of conductive material 77. A layer of mica or other insulating material 78 suitable for use in a vacuum is affixed to conductive sheet 77 and a series of apertures 79 are formed in the insulating material to expose areas of sheet 77 which effectively constitute the first series of lens elements 46. A second sheet or layer of conductive material 80 is affixed to insulating layer 78 and constitutes the second series of deflector elements 47; it is, of course, necessary to form apertures in conductive layer 80 which correspond to the apertures 79 in insulating layer 78. This composite deflector structure is particularly advantageous in that it provides effective capacitive couplings between the two deflector series so that the external coupling capacitors 50 and 51 shown in Figure 3 may be eliminated. If insulating layer 78 and conductive layer 80 are relatively thin, the two series of deflector elements are still substantially coplanar and the periodic guiding field is not made unduly irregular. If completely coplanar construction of the two deflector element series appears desirable for a given application, the slightly modified construction shown in cross section in Figure 8 may be adopted. In this structure, the portions of conductive sheet 77 juxtaposed with apertures 79 are stamped or coined to form vertical corrugations which extend outwardly into coplanar relationship with the individual elements 47 formed by sheet 80.

Figures 9, 10, 11:
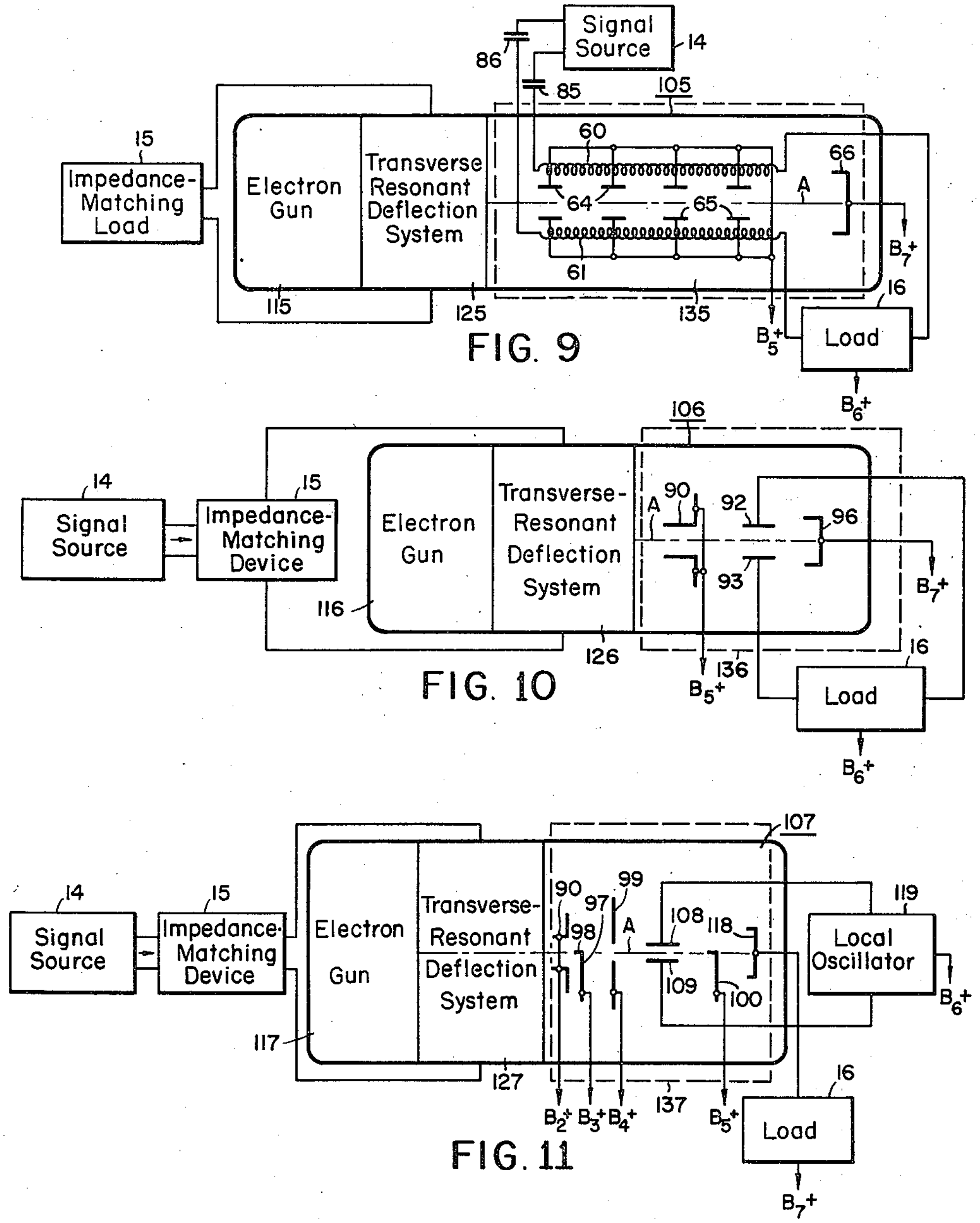
Figure 9 is a schematic diagram of a somewhat different embodiment of the invention.
Figure 10 is a schematic diagram of a further embodiment of the invention.
Figure 11 is a schematic illustration of a signal-converter embodiment of the invention.

Figure 9 illustrates a somewhat modified form of the invention which is in many respects essentially similar to that of Figure 3. As in the previous embodiments, the electron-discharge system of Figure 9 comprises an electron gun 115 and a transverse-resonant deflection system 125 which may be identical in construction with the similarly-designated elements 113 and 123 of Figure 3. An impedance-matching load 15 is coupled to deflection system 125 in the same manner as in Figure 3; the impedance-matching load for this particular embodiment may comprise merely a resistor having a conductance equal to the apparent conductance of the deflection system at the transverse resonance frequency.

The apparatus of Figure 9 further includes a deflection-sensitive output electrode system 135 which may be constructed similarly to the traveling-wave tube system 133 of Figure 3 and may include a pair of low-velocity wave-transmission lines comprising windings 60 and 61 disposed on opposite sides of the beam reference path A of the tube. A series of lens electrodes 64 may be interposed between conductive winding 60 and reference path A, and a similar series of lens elements 65 may be mounted intermediate conductive winding 61 and the reference path opposite electrodes 64. The collector 66 is again disposed transversely of the end of path A opposite deflection system 125. Lens electrode series 64 and 65 may be electrically interconnected with each other and may be connected to a source of operating potential $B_5+$; as before, collector 66 is connected to D. C. source $B_7+$. The ends of transmission-line windings 60 and 61 adjacent collector 66 are individually coupled to a load 16 and are electrically connected to an operating potential source $B_6+$.

The essential difference between the embodiment of Figure 9 and that of Figure 3 resides in the fact that signal source 14 is no longer coupled to deflection system 125. Instead, in this embodiment the signal source 14 is coupled by means of a pair of coupling capacitors 85 and 86 to the ends of wave-transmission lines 60 and 61 adjacent deflection system 125. With this system, the line-loading resistive elements 62 and 63 are omitted, since the two wave-transmission lines may now be properly terminated by source 14.

Insofar as reduction of noise in the electron stream is concerned, the operation of the electron-discharge device 105 illustrated in Figure 9 is identical with that of device 103 of Figure 3. In this system, however, the desired signal deflection is not applied to the electron beam before it emerges from deflection system 125; rather, the initial portions of wave-transmission lines 60 and 61 are employed to establish a deflection field which produces transverse excursions of the electron beam at a frequency approximately equal to the transverse-resonance frequency of deflection system 125. These transverse excursions, in turn, induce an amplified signal in the wave-transmission lines as in the previous embodiment; for a more detailed description of the operation of this particular output electrode system, reference may be had to the aforementioned copending Adler applications. The essential advantages of the invention with respect to noise immunity are obtained since the beam as it emerges from deflection system 125 is substantially noise-free at the signal frequency. Of course, in some systems it may be desirable to combine the features of the embodiments of Figures 3 and 9 and to apply the signal from source 14 to both the transverse-resonant deflection system and to the output electrode system.

Figure 10 shows an electron-discharge system comprising an additional embodiment of the invention and including a beam-deflection tube 106. Device 106 comprises an electron gun 116 which may be identical in construction with gun section 113 of Figure 3. The tube further includes a transverse-resonant deflection system 126 which may be essentially similar to section 123 of tube 103; as in the embodiment of Figure 3, a signal source 14 may be coupled to the deflection system by means of an impedance-matching device 15.

Tube 106 also includes a deflection-sensitive output electrode system 136. Electrode system 136 comprises a drift-space electrode 90 encompassing a portion of reference path A immediately following deflection system 126 and a pair of receptor plates 92 and 93 located on opposite sides of the reference path in inductive coupling relation to the electron beam. Receptor plates 92 and 93 are coupled to the load circuit 16 of the system and to a suitable source of positive operating potential $B_6+$. A collector electrode 96 is disposed transversely of reference path A at the end of system 136 farthest from deflection system 126; the collector electrode is connected to a source of positive operating potential $B_7+$, and electrode 90 is connected to a suitable D. C. source $B_5+$.

The electron gun 116 of tube 106 generates and projects a sheet-like beam of electrons between a pair of composite deflectors such as structures 44 and 45 in the embodiment of Figure 3. Noise energy present in the beam is to at least some extent adsorbed by the noise-reduction system comprising deflection system 126, source 14 and impedance-matching device 15; at the same time, the noise-reduction system does not induce noise at the transverse-resonance frequency into the electron stream. The beam is transversely deflected at the resonance frequency in response to signals applied to the deflection system from signal source 14, so that as the beam emerges into output system 126 it exhibits transverse excursions representative of the applied signal. The electrostatic guiding field does not continue beyond deflection system 126; as soon as the beam enters the field-free drift space established by electrode 90, the amplitude of its transverse excursions begins to increase. Accordingly, an amplified signal representative of the applied signal is induced in known fashion in receptor plates 92, 93 and is supplied to load 16. The electron beam continues along path A and is intercepted and collected by anode 96. Electrode 90 also provides electrostatic shielding between deflection system 126 and receptors 93 and 92.

The electron-discharge system comprising tube 106, like the previously-described embodiments, exhibits a substantial improvement in signal-to-noise ratio when compared with conventional devices. The transverse-resonant deflection system is tuned to the signal frequency and matched in impedance to source 14 by means of device 15 so that noise energy represented by transverse excursions of the beam electrons at signal frequency may be absorbed. At the same time, the noise-absorption system does not induce additional noise into the electron stream, as would be the case with conventional control systems. Consequently, two of the major sources of noise at high frequencies are substantially reduced or eliminated.

The electron-discharge system shown in Figure 11 includes a vacuum tube 107 comprising an electron gun section 117 and a transverse-resonant deflection system 127; electron gun 117 and deflection system 127 may be substantially identical in overall construction with gun 113 and deflection system 123 (Figure 3). As in the previously-described embodiments, a signal source 14 may be coupled to deflection system 127 by means of an impedance-matching device 15.

Tube 107 further includes a deflection-sensitive output electrode system 137; in this particular tube, the output electrode system comprises a converter or heterodyning stage. Electrode system 137 comprises a drift-space electrode 90 which may be similar in construction to the correspondingly designated electrode of tube 106, Figure 10. An interceptor electrode 97 extends half way across the reference path for the electron beam in tube 107 immediately following electrode 90; in other words, interceptor electrode 97 extends inwardly from one side of the reference path and has an edge 98 aligned with center line A of that reference path. Interceptor electrode 97 is followed by an accelerating electrode 99, a pair of deflectors 108 and 109, a second interceptor electrode 100, and a collector electrode 118. Deflectors 108 and 109 are disposed on opposite sides of the beam reference path and are connected to a local oscillator 119 and a source of operating potential $B_6+$. Collector 118 is connected to an unbalanced load 16 and to a D. C. operating potential source $B_7+$. Electrode 90, interceptor 97, beam limiting electrode 99, and interceptor 100 are each individually coupled to sources of positive unidirectional operating potential designated as $B_2+$, $B_3+$, $B+_4$, and $B_5+$ respectively.

When the electron-discharge system of Figure 11 is placed in operation, electron gun 117 generates and projects a beam of electrons along a reference path generally indicated by center line A. In deflection system 127, the electron beam is subjected to an electric guiding field comprising a multiplicity of electron lenses which establish a transverse-resonance frequency for the electron beam in addition to confining the beam to the desired path. The deflection system is tuned to this resonance frequency and is matched to source 14 by device 15 to form a noise-absorption system essentially similar to that of Figure 3. Consequently, noise energy in the electron beam represented by transverse excursions at the resonance frequency is absorbed by the noise-reduction system comprising source 14, matching device 15 and deflection system 127. In addition, the signal from source 14 is impressed upon the beam without additional noise signals therein. Thus, as the beam emerges from deflection system 127, its noise content at signal frequencies is relatively low and it exhibits transverse excursions representative of the signal applied from source 14 to system 127.

At the outset, in the deflection-sensitive output electrode system 137, the beam traverses the drift space defined by electrode 90 so that the signal-induced transverse excursions of the beam increase in amplitude. Interceptor electrode 97 collects approximately one half of the beam current; as a result, the beam that passes between deflectors 108 and 109 is effectively intensity-modulated at the signal frequency. Electrode 99 serves to refocus the electron beam.

A second signal is applied to deflectors 108 and 109 from local oscillator 119 for heterodyning purposes; the beam is thus subjected to a transverse deflection field at the local-oscillator frequency. Interceptor electrode 100 effectively collects the beam each time it swings across reference path A toward deflector 109, so that the beam current received by collector 118 is intensity-modulated in accordance with the second or local oscillator signal as well as the original signal from source 14. The signal appearing on collector 118 is applied to load 16, which may be tuned to an intermodulation product of the signal and local oscillator frequencies. The overall system may, for example, constitute a first detector for a television receiver or similar high-frequency device, in which event load 16 is tuned to an intermediate frequency equal to the difference between the input signal frequency and the local oscillator frequency.

The embodiment of Figure 11 thus realizes the principal advantages of the invention in a converter-amplifier device. The intermediate-frequency signal applied to load 16 has a substantially lower noise content than could be achieved with conventional control electrodes, since the original beam noise is strongly attenuated and the transverse-resonant deflection system 127 does not induce additional noise energy into the beam.

A relatively wide range of embodiments of the invention has been described and illustrated; however, each of the electron-discharge systems shown includes the same essential elements, although they vary widely in specific construction. For example, each of the systems of Figures 1, 2, 3, 9, 10, and 11 includes an electron gun, which may be of conventional construction, for projecting a beam of electrons along a given reference path. Moreover, each of the devices includes some means for developing a guiding field to produce a transverse electron resonance along a first portion of the reference path; the guiding-field system may be of the magnetic type, as represented by solenoid 28 of Figure 2, or may comprise a periodic electrostatic structure such as the composite deflectors 44 and 45 coupled to individual operating potential sources $B_1+$ and $B_2+$, as shown in Figure 3. Each of the illustrated embodiments of the invention includes some means to subject the electron beam to a variable transverse deflection field having a frequency approximately equal to the transverse-resonance frequency of the electron beam guiding field; in the embodiment of Figure 2, the signal is applied to the lumped deflectors 23 and 24, whereas in Figure 3 the signal is supplied to composite deflectors 44 and 45 and in Figure 9 it is supplied to wave-transmission lines 60 and 61. It should be noted that in a device such as tube 103 of Figure 3, individual elements of the composite deflectors must be insulated from each other for D. C. potential in order to develop the desired guiding field but some means must be included in the system to intercouple the same deflector elements at signal frequencies in order to establish the desired deflection field. Each of the described systems terminates in a deflection-sensitive electrode system which is coupled to the electron beam along a second portion of its reference path and which includes some means for increasing the signal-frequency transverse excursions of the electron beam and for generating an amplified signal representative of the applied signal.

Despite the wide variations in specific structure each of the embodiments of the invention effectively prevents the induction of noise energy into the electron beam of the system by the deflection system. In addition, noise energy originally present in the electron beam may be absorbed. As a result, substantially better noise figures may be obtained than are possible with conventional deflectors or with control grids or bunchers. Although certain of the structures employed appear to be relatively complex when shown in schematic form, they may actually be fabricated economically by relatively simple techniques, as illustrated by the particular structures of Figures 6–8. The electrostatic guiding-field system, as exemplified by the apparatus of Figure 3, is not restricted to any particular type of output electrode structure; on the contrary, the noise-absorption system employing an electric guiding field is readily adaptable for use with traveling-wave structures, conventional deflection-pickup systems, and converter electrode arrangements as exemplified by Figures 9–11. The external circuitry for the individual embodiments may be relatively simple so that the systems are not unduly burdened economically.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. An electron-discharge system comprising: electron gun means for projecting a beam of electrons along a given reference path; means for developing a guiding field along a predetermined portion of said reference path to confine said beam to said path throughout said portion thereof and to establish a transverse-resonance frequency for said electron beam; means responsive to an applied signal for subjecting said electron beam to a variable transverse deflection field having a frequency substantially equal to said transverse-resonance frequency to produce excursions of said electron beam from the center of said reference path; and a deflection-sensitive electrode system, coupled to said electron beam, including means for increasing the aforesaid transverse excursions of said electron beam and for generating an amplified signal representative of said applied signal.

2. A beam-deflection electron-discharge system comprising: electron gun means for projecting a beam of electrons along a given reference path; a noise-absorption system, comprising means for developing a guiding field along a predetermined portion of said reference path to establish a transverse-resonance frequency for said electron beam and further including a pair of deflectors disposed on opposite sides of said first portion of said reference path in inductive coupling relation to said electron beam and an impedance device interconnecting said deflectors to form a resonant circuit tuned to said transverse-resonance frequency, for absorbing undesired transverse-resonance-frequency energy from said beam; means, including a source of signals having a frequency substantially equal to said transverse-resonance frequency, for subjecting said electron beam to a transverse deflection field to produce excursions of said electron beam from the center of said reference path; and a deflection-sensitive electrode system, coupled to said electron beam along a second portion of said reference path, including means for increasing the aforesaid transverse excursions of said electron beam and for generating an amplified signal representative of said applied signal.

3. A beam-deflection electron-discharge system comprising: electron gun means for projecting a beam of electrons along a given reference path; means for developing a guiding field along a first predetermined portion of said reference path to confine said beam to said path throughout said portion thereof and to establish a transverse-resonance frequency for said electron beam; a noise-absorption system, comprising a pair of deflectors disposed on opposite sides of said first portion of said reference path in inductive coupling relation to said electron beam and an impedance-matching device interconnecting said deflectors to form a resonant circuit tuned to said transverse-resonance frequency, for absorbing undesired transverse-resonance-frequency energy from said beam; means for applying signals having a frequency equal to said transverse-resonance frequency to said two deflectors to subject said electron beam to a signal-frequency transverse deflection field to produce excursions of said electron beam from the center of said reference path; and a deflection-sensitive electrode system, coupled to said electron beam along a second portion of said reference path, including means for increasing the aforesaid transverse excursions of said electron beam and for generating an amplified signal representative of said applied signal.

4. A beam-deflection electron-discharge system comprising: electron gun means for projecting a beam of electrons along a given reference path; means for developing a guiding field along a first predetermined portion of said reference path to confine said beam to said path throughout said portion thereof and to establish a transverse-resonance frequency for said electron beam; means responsive to an applied signal for subjecting said electron beam to a variable transverse deflection field having a frequency substantially equal to said transverse-resonance frequency to produce excursions of said electron beam from the center of said reference path; and a deflection-sensitive electrode system, comprising a low-velocity wave-transmission line disposed adjacent a second portion of said reference path in inductive coupling relation to said electron beam, for increasing the aforesaid transverse excursions of said electron beam and for generating an amplified signal representative of said applied signal.

5. A beam-deflection electron-discharge system comprising: electron gun means for projecting a beam of electrons along a given reference path; means for developing a magnetic guiding field throughout said reference path to confine said beam to said path and to establish a transverse-resonance cyclotron frequency for said electron beam; means, comprising a pair of deflectors disposed on opposite sides of a first portion of said reference path in inductive coupling relation to said electron beam, responsive to an applied signal for subjecting said electron beam to a variable transverse deflection field having a frequency substantially equal to said transverse-resonance frequency to produce excursions of said electron beam from the center of said reference path; and a deflection-sensitive electrode system, comprising a low-velocity wave-transmission line disposed adjacent a second portion of said reference path in inductive coupling relation to said electron beam, for increasing the aforesaid transverse excursions of said electron beam and for generating an amplified signal representative of said applied signal.

6. A beam-deflection electron-discharge system comprising: electron gun means for projecting a beam of electrons along a given reference path; means for developing a homogeneous magnetic guiding field throughout said reference path to confine said beam to said path and to establish a transverse-resonance cyclotron frequency for said electron beam; a deflection system comprising a pair of deflectors, responsive to an applied signal, for subjecting said electron beam to a variable transverse deflection field having a frequency substantially equal to said transverse-resonance frequency as said beam traverses a first portion of said reference path to produce excursions of said electron beam from the center of said reference path; means interconnecting said deflectors to form a resonant circuit tuned to said transverse-resonance frequency, said interconnecting means having a conductance substantially equal to the apparent conductance of said deflection system at said transverse-resonance frequency; a deflection-sensitive electrode system, comprising a pair of wave-transmission lines disposed on opposite sides of a second portion of said reference path in inductive coupling relation to said electron beam for increasing the aforesaid transverse excursions of said electron beam and for generating an amplified signal representative of said applied signal, said wave-transmission lines having a low wave-propagation velocity in a direction parallel to said reference path and further having a length in said direction which is large relative to the effective wavelength of a signal wave traveling along said lines; and means for maintaining said electron beam at a velocity substantially equal to twice said transmission line wave-propagation velocity as said beam traverses said second portion of said path.

7. A beam-deflection electron-discharge system comprising: electron gun means for projecting a beam of electrons along a given reference path; means for developing an electrostatic guiding field, comprising a series of convergent electrostatic lenses disposed along a first predetermined portion of said reference path, to confine said beam to said path throughout said portion thereof and to establish a transverse-resonance frequency for said electron beam; means responsive to an applied signal for subjecting said electron beam to a variable transverse deflection field having a frequency substantially equal to said transverse-resonance frequency to produce excursions of said electron beam from the center of said reference path; and a deflection-sensitive electrode system, coupled to said electron beam along a second portion of said reference path, including means for increasing the aforesaid transverse excursions of said electron beam and for generating an amplified signal representative of said applied signal.

8. A beam-deflection electron-discharge system comprising: electron gun means for projecting a beam of electrons along a given reference path; means for developing an electrostatic field to confine said beam to said path throughout said portion thereof and to establish a transverse-resonance frequency for said electron beam; means responsive to an applied signal for subjecting said electron beam to a variable transverse deflection field having a frequency substantially equal to said transverse-resonance frequency to produce excursions of said electron beam from the center of said reference path; and a deflection-sensitive electrode system, comprising a low-velocity wave-transmission line at least a part of which is disposed adjacent a second portion of said reference path, for increasing the aforesaid transverse excursions of said electron beam and for generating an amplified signal representative of said applied signal.

9. A beam-deflection electron-discharge system comprising: electron gun means for projecting a beam of electrons along a given reference path; means for developing an electrostatic guiding field to confine said beam to said path throughout said portion thereof and to establish a transverse-resonance frequency for said electron beam; means responsive to an applied signal for subjecting said electron beam to a variable transverse deflection field having a frequency substantially equal to said transverse-resonance frequency to produce excursions of said electron beam from the center of said reference path; and a deflection-sensitive electrode system, comprising a pair of low-velocity wave-transmission lines disposed adjacent opposite sides of a second portion of said reference path, for increasing the aforesaid transverse excursions of said electron beam and for generating an amplified signal representative of said applied signal.

10. A beam-deflection electron-discharge system comprising: electron gun means for projecting a beam of electrons along a given reference path; means for developing an electrostatic guiding field to confine said beam to said path throughout said portion thereof, to establish a transverse-resonance frequency for said electron beam, and to derive induced voltages representative of transverse excursions of said electron beam at said frequency; means responsive to an applied signal for subjecting said electron beam to a variable transverse deflection field having a frequency substantially equal to said transverse-resonance frequency to produce excursions of said electron beam from the center of said reference path; and a deflection-sensitive electrode system, comprising a pair of wave-transmission lines disposed adjacent opposite sides of a second portion of said reference path in inductive coupling relation to said electron beam and each having a low wave-propagation velocity in a direction parallel to said path and a length in said direction which is large relative to the effective wavelength of a signal wave traveling along said line, for increasing the aforesaid signal-induced transverse excursions of said electron beam and for generating an amplified signal representative of said applied signal.

11. A beam-deflection electron-discharge system comprising: electron gun means for projecting a beam of electrons along a given reference path; means for developing an electrostatic guiding field, comprising a series of convergent electrostatic lenses disposed along a first predetermined portion of said reference path, to confine said beam to said path throughout said portion thereof, to establish a transverse-resonance frequency for said electron beam, and to absorb energy from transverse excursions of said beam recurring at said resonance frequency; means, including a source of signals having a frequency substantially equal to said transverse-resonance frequency, for subjecting said electron beam to a variable transverse deflection field to produce excursions of said electron beam from the center of said reference path; a deflection-sensitive electrode system, comprising a pair of wave-transmission lines disposed adjacent opposite sides of a second portion of said reference path in inductive coupling relation to said electron beam and each having a low wave-propagation velocity in a direction parallel to said path and a length in said direction which is large relative to the effective wavelength of a signal wave traveling along said line, for increasing the aforesaid signal-induced transverse excursions of said electron beam and for generating an amplified signal representative of said applied signal; and means for establishing a second guiding field comprising a series of convergent electrostatic lenses periodically distributed along said second portion of said path to confine said beam to said path throughout said length of said wave-transmission lines.

12. A beam-deflection electron-discharge system comprising: electron gun means for projecting a beam of electrons along a given reference path; means for developing an electrostatic guiding field to confine said beam to said path throughout said portion thereof and to establish a transverse-resonance frequency for said electron beam; means responsive to an applied signal for subjecting said electron beam to a variable transverse deflection field having a frequency substantially equal to said transverse-resonance frequency to produce excursions of said electron beam from the center of said reference path; and a deflection-sensitive output electrode system for increasing the aforesaid transverse excursions of said electron beam and for generating an amplified signal representative of said applied signal, said output electrode system comprising a substantially field-free drift space followed by a pair of output electrodes coupled to said electron beam.

13. A beam-deflection electron-discharge system comprising: electron gun means for projecting a beam of electrons along a given reference path; means for developing an electrostatic guiding field to confine said beam to said path throughout said portion thereof and to establish a transverse-resonance frequency for said electron beam; means responsive to an applied signal for subjecting said electron beam to a variable transverse deflection field having a frequency substantially equal to said transverse-resonance frequency to produce excursions of said electron beam from the center of said reference path; and a deflection-sensitive output electrode system, for increasing the aforesaid transverse excursions of said electron beam and for generating an amplified signal representative of said applied signal, said output electrode system comprising, in the order named along a second portion of said reference path, a substantially field-free drift space and a pair of receptor electrodes disposed on opposite sides of said reference path in inductive coupling relation to said electron beam.

14. A beam-deflection electron-discharge system comprising: electron gun means for projecting a beam of electrons along a given reference path; means for developing an electrostatic guiding field, comprising a series of convergent electrostatic lenses disposed along a first predetermined portion of said reference path, to confine said beam to said path throughout said portion thereof and to establish a transverse-resonance frequency for said electron beam; a deflection system comprising a pair of deflectors, responsive to an applied signal, for subjecting said electron beam to a variable transverse deflection field having a frequency substantially equal to said transverse-resonance frequency to produce excursions of said electron beam from the center of said reference path; means interconnecting said deflectors to form a resonant circuit tuned to said transverse-resonance frequency, said interconnecting means having a conductance substantially equal to the apparent conductance of said deflection system at said transverse-resonance frequency; and a deflection-sensitive output electrode system, for increasing the aforesaid transverse excursions of said electron beam and for generating an amplified signal representative of said applied signal, said output electrode system comprising, in the order named along a second portion of said reference path, a shield electrode for establishing a substantially field-free drift space, a pair of receptor electrodes disposed on opposite sides of said reference path in inductive coupling relation to said electron beam, and a collector electrode disposed transversely of said reference path for intercepting and collecting at least a portion of said electron beam.

15. A beam-deflection electron-discharge system comprising: electron gun means for projecting a beam of electrons along a given reference path; means for developing an electrostatic guiding field to confine said beam to said path throughout said portion thereof and to establish a transverse-resonance frequency for said electron beam; means responsive to an applied signal for subjecting said electron beam to a variable transverse deflection field having a frequency substantially equal to said transverse-resonance frequency to produce excursions of said electron beam from the center of said reference path; and a deflection-sensitive electrode system comprising a substantially field-free drift space for increasing the aforesaid transverse excursions of said electron beam and an output electrode coupled to said electron beam for developing an amplified signal representative of said applied signal.

16. A beam-deflection electron-discharge system comprising: electron gun means for projecting a beam of electrons along a given reference path; means for developing an electrostatic guiding field to confine said beam to said path throughout said portion thereof and to establish a transverse-resonance frequency for said electron beam; means responsive to a first applied signal for subjecting said electron beam to a variable transverse deflection field having a frequency substantially equal to said transverse-resonance frequency to produce excursions of said electron beam from the center of said reference path; and a deflection-sensitive electrode system, comprising a substantially field-free drift space for increasing the aforesaid transverse excursions of said electron beam, a modulating electrode system for modulating said electron beam in response to a second applied signal, and an output electrode coupled to said electron beam for developing a signal representative of the intermodulation products of said first signal, in amplified form, and said second signal.

17. A beam-deflection electron-discharge system comprising: electron gun means for projecting a beam of electrons along a given reference path; means for developing an electrostatic guiding field, comprising a series of convergent electrostatic lenses disposed along a first predetermined portion of said reference path, to confine said beam to said path throughout said portion thereof and to establish a transverse-resonance frequency for said electron beam; a deflection system comprising a pair of deflectors responsive to a first applied signal for subjecting said electron beam to a variable transverse deflection field at least partially coincident in space with said guiding field and having a frequency substantially equal to said transverse-resonance frequency to produce excursions of said electron beam from the center of said reference path; means interconnecting said deflectors to form a resonant circuit tuned to said transverse-resonance frequency, said interconnecting means having a conductance substantially equal to the apparent conductance of said deflection system at said transverse-resonance frequency; and a deflection-sensitive electrode system, comprising a shield electrode for establishing a substantially field-free drift space for increasing the aforesaid transverse excursions of said electron beam, a modulating electrode system for modulating said electron beam in response to a second applied signal, and a collector electrode disposed transversely of said reference path for intercepting at least a portion of said electron beam to develop a signal representative of the intermodulation products of said first signal, in amplified form, and said second signal.

18. A noise-absorption system for an electron-discharge device of the beam deflection type including electron gun means for projecting an electron beam along a given reference path and a deflection-sensitive output electrode system, said noise-absorption system comprising: a first deflector structure comprising a first and a second series of deflector elements disposed in interleaved fashion adjacent one side of a predetermined portion of said reference path intermediate said electron gun means and said output electrode system; a second deflector structure, substantially identical electrically and physically with said first deflector structure, comprising a third and a fourth series of deflector elements disposed in interleaved fashion adjacent the opposite side of said reference path with elements of said third deflector series opposite elements of said first series and with said fourth series opposite said second series; means for maintaining said first and third series of deflector elements at a first predetermined unidirectional operating potential; means for maintaining said second and fourth series of deflector elements at a second predetermined unidirectional operating potential different from said first potential; and means for deriving radio-frequency power from transverse excursions of that portion of said electron beam encompassed by said deflector structures.

19. A noise-absorption system for an electron-discharge device of the beam-deflection type including electron gun means for projecting an electron beam along a given reference path and a deflection-sensitive output electrode system, said noise-absorption system comprising: a first deflector structure comprising a first and a second series of deflector elements disposed in interleaved fashion adjacent one side of said reference path intermediate said electron gun means and said output electrode system; a second deflector structure, substantially identical electrically and physically with said first deflector structure, comprising a third and a fourth series of deflector elements disposed in interleaved fashion adjacent the opposite side of said reference path with elements of said third deflector series directly opposite elements of said first series and with said second and fourth series elements directly opposite each other; means for maintaining said first and third series of deflector elements at a first predetermined unidirectional operating potential; means for maintaining said second and fourth series of deflector elements at a second predetermined unidirectional operating potential different from said first potential; means for electrically interconnecting all of said elements of said first and second series of deflector elements at radio frequencies; means for electrically interconnecting all of said elements of said third and fourth series of deflector elements at radio frequencies; and means for deriving radio-frequency power from transverse excursions of that portion of said electron beam encompassed by said deflector structures.

20. A noise-absorption system for an electron-discharge device of the beam-deflection type including electron gun means for projecting an electron beam along a given reference path and a deflection-sensitive output electrode system, said noise-absorption system comprising: a first deflector structure comprising a first and a second series of deflector elements disposed in interleaved fashion adjacent one side of said reference path intermediate said electron gun means and said output electrode system; a second deflector structure, substantially identical electrically and physically with said first deflector structure, comprising a third and a fourth series of deflector elements disposed in interleaved fashion adjacent the opposite side of said reference path with elements of said third deflector series directly opposite elements of said first series and with said fourth series opposite said second series; means for maintaining said first and third series of deflector elements at a first predetermined unidirectional operating potential; means for maintaining said second and fourth series of deflector elements at a second predetermined operating potential different from said first potential; and a noise absorption load circuit intercoupling at least one of said first and second deflector element series with one of said third and fourth series.

21. A noise-absorption system for an electron-discharge device of the beam-deflection type including electron gun means for projecting an electron beam along a given reference path and a deflection-sensitive output electrode system, said noise-absorption system comprising: a first deflector structure comprising a first and a second series of deflector elements disposed in substantially coplanar interleaved fashion adjacent one side of said reference path intermediate said electron gun means and said output electrode system; a second deflector structure, substantially identical electrically and physically with said first deflector structure, comprising a third and a fourth series of deflector elements disposed in substantially coplanar interleaved fashion adjacent the opposite side of said reference path with elements of said third deflector series directly opposite elements of said first series and with said fourth series opposite said second series; means for maintaining said first and third series of deflector elements at a first predetermined operating potential; means for maintaining said second and fourth series of deflector elements at a second predetermined operating potential different from said first potential; and a noise-absorption load circuit electrically intercoupling said first and second deflector element series with said third and fourth series for radio frequencies.

22. A noise-absorption system for an electron-discharge device of the beam deflection type including electron gun means for projecting an electron beam along a given reference path and a deflection-sensitive output electrode system, said noise-absorption system comprising: a first deflector structure mounted adjacent one side of said reference path intermediate said electron gun means and said output electrode system, said deflector structure comprising a first conductive member, a second conductive member disposed in spaced parallel relationship to said first member intermediate said first member and said reference path, and a first layer of insulating material interposed between said first and second conductive members, said second conductive member and said insulating layer including a series of apertures distributed along said reference path to expose portions of said first conductive member to said beam; a second deflector structure, substatially identical electrically and physically with said first deflector structure, mounted adjacent the opposite side of said reference path and comprising a third conductive member corresponding to said first conductive member, a second insulating layer, and a fourth conductive member corresponding to said second conductive member, said fourth conductive member and said second insulating layer including a series of apertures disposed opposite said apertures of said first deflector structure; means for maintaining said first and third conductive members at predetermined unidirectional operating potential; means for maintaining said second and fourth conductive members at a different predetermined operating potential; and means for deriving radio-frequency power from transverse excursions of that portion of said electron beam encompassed by said deflector structures.

23. A noise-absorption system for an electron-discharge device of the beam deflection type including electron gun means for projecting an electron beam along a given reference path and a deflection-sensitive output electrode system, said noise-absorption system comprising: a first deflector structure mounted adjacent one side of said reference path intermediate said electron gun means and said output electrode system, said deflector structure comprising a first conductive member, a second conductive member disposed in spaced parallel relationship to said first member intermediate said first member and said reference path, and a first layer of insulating material interposed between said first and second conductive members, said second conductive member and said insulating layer including a series of apertures distributed along said reference path to expose portions of said first conductive member to said beam; a second deflector structure, substantially identical electrically and physically with said first deflector structure, mounted adjacent the opposite side of said reference path and comprising a third conductive member corresponding to said first conductive member, a second insulating layer, and a fourth conductive member corresponding to said conductive member, said fourth conductive member and said second insulating layer including a series of apertures disposed opposite said apertures of said first deflector structure; means for maintaining said first and third conductive members at a predetermined unidirectional operating potential; means for maintaining said second and fourth conductive members at a different predetermined operating potential to develop a guiding field comprising a series of electrostatic lenses distributed along said reference path for confining said beam to said path and for establishing a transverse-resonance frequency for said electron beam; and a noise-absorption load intercoupling said first and second deflector structures to form therewith a resonant circuit tuned to said transverse-resonance frequency.

24. A noise-absorption system for an electron-discharge device of the beam deflection type including electron gun means for projecting an electron beam along a given reference path and a deflection-sensitive output electrode system, said noise-absorption system comprising: a first deflector structure comprising a first and a second series of deflector elements disposed in interleaved fashion adjacent one side of said reference path intermediate said electron gun means and said output electrode system; a second deflector structure, substantially identical electrically and physically with said first deflector structure, comprising a third and a fourth series of deflector elements disposed in interleaved fashion adjacent the opposite side of said reference path with elements of said third deflector series directly opposite elements of said first series and with said fourth series opposite said second series; means for maintaining said first and third series of deflector elements at a first predetermined operating potential; means for maintaining said second and fourth series of deflector elements at a second predetermined operating potential to develop a guiding field comprising a series of electrostatic lenses distributed along said reference path for confining said beam to said path and for establishing a transverse resonance frequency for said electron beam; means for electrically interconnecting all of said elements of said first and second series of deflector elements at radio frequencies only; means for electrically interconnecting all of said elements of said third and fourth series of deflector elements at radio frequencies only; and a noise-absorption load intercoupling said first and second deflector structures to form therewith a resonant circuit tuned to said transverse-resonance frequency, said load having a conductance substantially equal to the inter-electrode resonance-frequency conductance between said deflector structures.

25. A noise absorption system for an electron-discharge device of the beam deflection type including electron gun means for projecting an electron beam along a given reference path and a deflection-sensitive output electrode system, said noise-absorption system comprising: a first composite deflector electrode structure mounted adjacent one side of said reference path intermediate said electron gun means and said output electrode system, said deflector electrode structure comprising a first sheet of conductive material of predetermined length and height, a first layer of insulating material affixed to said first conductive sheet and including a plurality of apertures approximately equal in height to the height of said first conductive sheet periodically distributed along the length of said sheet, and a second sheet of conductive material affixed to said first insulating layer opposite said first conductive sheet and including a corresponding plurality of apertures aligned with said apertures of said first insulating layer; a second composite deflector electrode structure, substantially identical electrically and physically with said first deflector electrode structure, mounted adjacent the opposite side of said reference path and comprising a third sheet of conductive material corresponding to said first sheet of conductive material, a second insulating layer, and a fourth sheet of conductive material corresponding to said second sheet of conductive material, said fourth sheet of conductive material and said second insulating layer including a series of apertures disposed opposite said apertures of said first deflector electrode structure; means for maintaining said first and third sheets of conductive material at a predetermined unidirectional operating potential; means for maintaining said second and fourth sheets of conductive material at a different predetermined operating potential; and means for deriving radio-frequency power from transverse excursions of that portion of said electron beam encompassed by said deflector electrode structures.

26. A noise absorption system for an electron-discharge device of the beam deflection type including electron gun means for projecting an electron beam along a given reference path and a deflection-sensitive output electrode system, said noise-absorption system comprising: a first composite deflector electrode structure mounted adjacent one side of said reference path intermediate said electron gun means and said output electrode system, said deflector electrode structure comprising a first sheet of conductive material of predetermined length and height having a plurality of vertical corrugations periodically distributed along its length, a first layer of insulating material affixed to said first conductive sheet and including a corresponding plurality of apertures approximately equal in height to the height of said first conductive sheet and periodically distributed along the length of said sheet in alignment with said vertical corrugations, and a second sheet of conductive material affixed to said insulating layer opposite said first conductive sheet and including a corresponding plurality of apertures aligned with said apertures of said first insulating layer; a second composite deflector electrode structure, substantially identical electrically and physically with said first deflector electrode structure, mounted adjacent the opposite side of said reference path and comprising a third sheet of conductive material corresponding to said first sheet of conductive material, a second insulating layer, and a fourth sheet of conductive material corresponding to said second sheet of conductive material, said fourth sheet of conductive material and said second insulating layer including a series of apertures disposed opposite said apertures of said first deflector electrode structure; means for maintaining said first and third sheets of conductive material at predetermined unidirectional operating potential;

means for maintaining said second and fourth sheets of conductive material at a different predetermined operating potential; and means for deriving radio-frequency power from transverse excursions of that portion of said electron beam encompassed by said deflector electrode structure.

References Cited in the file of this patent

UNITED STATES PATENTS

| | | |
|---|---|---|
| 2,275,480 | Varian et al. | Mar. 10, 1942 |
| 2,294,659 | Herold | Sept. 1, 1942 |
| 2,391,273 | Rutherford | Dec. 18, 1945 |
| 2,433,044 | Haeff | Dec. 23, 1947 |
| 2,600,373 | Moore | June 10, 1952 |
| 2,616,990 | Knol et al. | Nov. 4, 1952 |
| 2,623,167 | Diemer | Dec. 23, 1952 |
| 2,627,049 | Shawfrank | Jan. 27, 1953 |
| 2,650,956 | Heising | Sept. 1, 1953 |